United States Patent [19]

McKemie

[11] Patent Number: 4,971,154
[45] Date of Patent: Nov. 20, 1990

[54] HARROW ASSEMBLY

[75] Inventor: George R. McKemie, Lindale, Ga.

[73] Assignee: Rome Industries, Inc., Cedartown, Ga.

[21] Appl. No.: 361,631

[22] Filed: Jun. 2, 1989

[51] Int. Cl.⁵ .......................... A01B 5/04; A01B 73/06
[52] U.S. Cl. .................................... 172/240; 172/248; 172/311; 172/597
[58] Field of Search ............... 172/310, 311, 324, 452, 172/454, 455, 568, 579, 580, 597, 598, 599, 600, 677, 679, 240, 248

[56] References Cited

U.S. PATENT DOCUMENTS

| | | | |
|---|---|---|---|
| 1,421,047 | 6/1922 | Ward | 172/588 |
| 1,718,797 | 6/1929 | Mowry | 172/588 |
| 2,247,534 | 7/1941 | Von Schlegell | 172/7 |
| 2,251,788 | 8/1941 | Goble | 172/589 |
| 2,421,772 | 6/1947 | Brundage | 172/677 X |
| 2,437,321 | 3/1948 | Hawkins | 172/596 |
| 2,583,830 | 1/1952 | Goble | 172/442 |
| 2,604,746 | 7/1952 | Frank et al. | 172/568 |
| 2,608,813 | 9/1952 | Frank | 172/597 |
| 2,608,814 | 9/1952 | Frank | 172/580 |
| 2,633,686 | 4/1953 | Domries | 172/406 |
| 2,685,159 | 8/1954 | Brundage | 172/580 |
| 2,759,312 | 8/1956 | Rasmussen et al. | 172/442 |
| 2,775,086 | 12/1956 | Vaughn et al. | 172/588 |
| 2,860,471 | 11/1958 | Welch | 172/597 |
| 2,931,447 | 4/1960 | Kramer | 172/572 |
| 2,981,345 | 4/1961 | Hamilton | 172/597 |
| 3,033,295 | 5/1962 | Brundage | 172/597 |
| 3,080,931 | 3/1963 | Heckathorn | 172/455 |
| 3,460,630 | 8/1969 | Richey et al. | 172/581 |
| 3,486,565 | 12/1969 | Heckathorn et al. | 172/572 |
| 3,519,085 | 7/1970 | Heckathorn et al. | 172/597 |
| 3,572,445 | 3/1971 | Richey et al. | 172/445 |
| 3,648,781 | 3/1972 | Mayer | 172/568 |
| 4,136,743 | 1/1979 | van der Lely | 172/311 X |
| 4,308,919 | 1/1982 | Coughran, Jr. | 172/240 |
| 4,591,003 | 5/1986 | Broome et al. | 172/597 |

FOREIGN PATENT DOCUMENTS 2417243 10/1979 France ................ 172/240

OTHER PUBLICATIONS

Marchesan, Super Tatu-GNM Serie 678 Grande Niveladora Mecanica.
Marchesan, Super Tatu-GN Serie 977 Grande Niveladora.

Primary Examiner—Randolph A. Reese
Assistant Examiner—Jeffrey L. Thompson
Attorney, Agent, or Firm—Hurt, Richardson, Garner, Todd & Cadenhead

[57] ABSTRACT

A harrow assembly adapted to be towed by a towing vehicle in either a working mode or a transport mode. The harrow assembly includes front and rear offset disc harrow units pivoted at one end portion. Each offset disc harrow unit includes a transport wheel assembly, each assembly having a pair of opposed, spaced transport wheels arranged on either side of the respective harrow units.

4 Claims, 3 Drawing Sheets

HARROW ASSEMBLY

BACKGROUND OF THE INVENTION

1. Field of the Invention

This invention relates to a harrow assembly, and is more particularly concerned with an offset wheel or disc harrow designed to be towed by a vehicle in either a working mode or in a transport mode.

2. Description of the Prior Art

Hinge-type offset wheel harrows incorporating gangs of spaced discs are widely known and have been manufactured to incorporate various embodiments and features Due primarily to improvements in towing vehicles such as tractors, there is a trend to manufacture these harrows structurally larger than harrows previously manufactured. While the larger harrows are generally more durable and efficient than the smaller counterparts of the prior art, by increasing the size of disc harrows, various problems are encountered. For example, the disc harrows previously known were generally small enough to permit the drawbar assembly to be manually biased in an operable or in an inoperable position. Further, such a relatively lightweight drawbar could be manually removed from a harrow working position and installed in a harrow transport position. In U.S. Pat. No. 3,460,630 to Richey, the working drawbar is manually biased. The transport drawbar or tongue must be manually removed when the disc harrow is in a working position, and manually installed when the harrow is in a transport position, because the transport drawbar would interfere with the pivoting of the individual harrow units in the working mode. This arrangement is also utilized in an offset disc harrow manufactured by Marchesan under the name Super Tatu ®. Because of the size of the harrow assembly of the present invention, however, the draw bar assemblies used to pull the harrow in either working or transport modes must include large, heavy steel elements which cannot be easily, manually removed and installed or easily, manually biased in an operable or inoperable position. The drawbar assemblies utilized in the prior art, therefore, are not suitable for use in the present invention.

Further, there are various means disclosed in the prior art to permit an offset disc harrow to be towed in a non-working or transport mode. This is advantageous when, for example, it is necessary to move the harrow from one field to another over a road or public highway. U.S. Pat. No. 3,460,630 also discloses a transport means in the form of wheels arranged parallel to and on either side of the entire harrow assembly. Because of the arrangement of the front and rear units of this harrow when collapsed for transportation, however, it is not possible to provide additional transport wheels between the harrow units themselves. The transport means of U.S. Pat. No. 3,460,630 is, therefore, limited in this respect, and is less stable than the present invention when being towed in the transport mode. Similarly, the Marchesan harrow utilizes outer transport wheels only. U.S. Pat. No. 4,308,919 to Coughran discloses another type of disc harrow having transport wheel assemblies. In this reference, however, the wheels are arranged between the individual harrow units only, but are transverse to the harrow units. The harrow assembly, therefore, is towed in the same orientation in the transport mode as the orientation in which it is towed in the working mode. This leads to difficulties when the harrow is being transported on the public highways since the large harrow assemblies of today are often wider than the individual road lanes. Other disc harrows which exemplify the harrows of the prior art are disclosed in U.S. Pat. No. 3,648,781 to Mayer, U.S. Pat. No. 2,931,447 to Kramer, and U.S. Pat. No. 2,860,471 to Welch. Because of the increasingly large structure of today's disc harrows, however, the embodiments previously used to provide transportation means for the disc harrows are less desirable than the structure of the present invention.

SUMMARY OF THE INVENTION

Briefly described, the present invention includes a harrow assembly having a pair of spaced, disc harrow units. The harrow units are hingedly connected at one end by a hinge assembly having a longer hinge or coupling arm attached to the front harrow unit, and a shorter coupling arm attached at one end to the rear harrow unit and pivotally connected to the longer arm. The hinge assembly also serves to space the front and rear units sufficiently to allow for the toggle linkage and transport wheel assemblies as described later. The longer arm of the hinge assembly is also of a sufficient length so that its floating end or pivot point extends towards the rear harrow unit past the center line of the area between the front and rear harrow units. This allows the longer hinge arm to carry support brackets for the integral transport drawbar.

A working drawbar assembly is hingedly attached to the front harrow unit to connect the harrow assembly to a towing vehicle and for towing the harrow assembly in a working mode. This drawbar assembly is selectively raised or lowered by pivoting on support brackets extending from the front harrow unit. Therefore, this drawbar assembly can be lowered to communicate with a hitch of a towing vehicle for towing in a working mode, or can be raised vertically or substantially vertically so that the working drawbar assembly is out of the way when the harrow assembly is towed in a transport mode.

The front harrow unit and rear harrow unit are selectively biased by a stabilizing assembly which includes a toggle linkage and a hydraulic actuating assembly, so that the units are selectively pivoted at the hinge assembly. The units can be pivoted toward one another until the front and rear units are substantially parallel for transport, or can be pivoted offset and rigidly anchored with respect to one another, at various, selected angles, into a working mode.

The present invention also includes transport wheel assemblies associated with each harrow unit. Unlike the harrows of the prior art, the transport wheel assemblies of the present invention include transport wheels arranged parallel to and on either sides of both the front and the rear harrow units. This is accomplished by utilizing a yoke journaled on the frame of each harrow unit, so that the respective harrow unit passes through the arms or tines of the yoke when the transport wheel assembly is actuated downwardly. The transport wheels are arranged on each tine of the yoke. Unlike the harrows of the prior art, the harrow assembly of the present invention provides for the necessary space between the front and rear harrow units to allow for the transport wheel assemblies disclosed in the present invention. Further, a hydraulic actuating assembly is independently associated with each transport wheel assembly to permit the transport wheels to be biased into either an operating or non-operating position.

The harrow assembly of the present invention is, therefore, more stable when being operated in a transport mode than the harrow assemblies of the prior art. In other words, when the harrow assembly of the present invention is being towed in a transport mode, the assembly is much less likely to sway from side to side. This problem can occur when harrow assemblies of the prior art are towed in a transport mode, and is greatly lessened by the present invention.

Further the harrow assembly of the present invention utilizes a hydraulic system which allows for the appropriate hydraulic cylinder assemblies to be actuated simultaneously when a single hydraulic line is energized. This feature enhances the safety of the harrow assembly.

Accordingly, it is an object of the present invention to provide a harrow assembly that is efficient in operation and durable in structure.

Another object to the present invention is to provide a harrow assembly which can be selectively towed in either a working mode or in a transport mode.

Another object of the present invention is to provide a harrow assembly which includes actuating means to raise and lower the towing drawbar and actuating means to raise and lower the working drawbar.

Another object of the present invention is to provide a harrow assembly having increased stability when towed in a transport mode.

Another object of the present invention is to provide a harrow assembly which includes a transport wheel assembly having a pair of spaced, transport wheels associated with each individual harrow unit.

Another object of the present invention is to provide a harrow assembly which includes a first integral drawbar for towing the assembly in a working mode and a second, integral drawbar for towing the harrow assembly in a transport mode.

Another object of the present invention is to provide a harrow assembly in which each transport wheel assembly includes a transport wheel on each side of both the front and the rear harrow units.

Another object of the present invention is to provide a harrow assembly having a safe and efficient hydraulic actuating system.

Other objects, features and advantages of the present invention will become apparent from the following description when taken in conjunction with the accompanying drawings, wherein like characters of reference designate corresponding parts throughout the several views.

DESCRIPTION OF THE PREFERRED EMBODIMENTS

Figure 1:
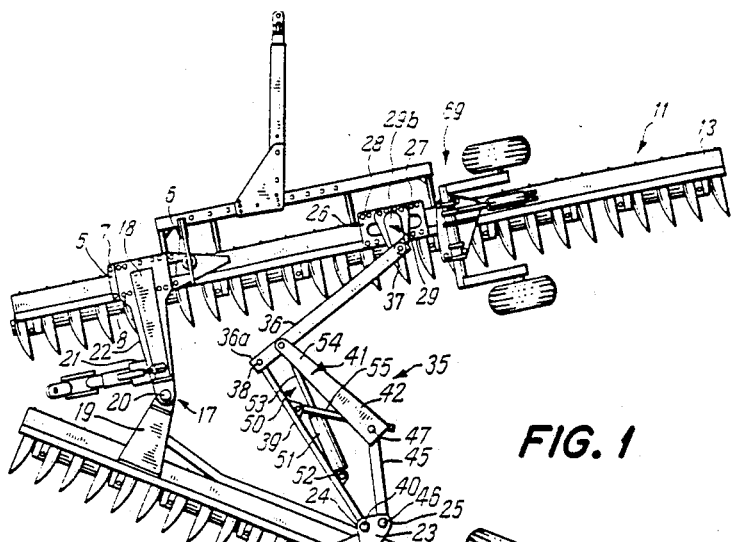
FIG. 1 is a plan view of the present invention in a working mode.
Figure 3:
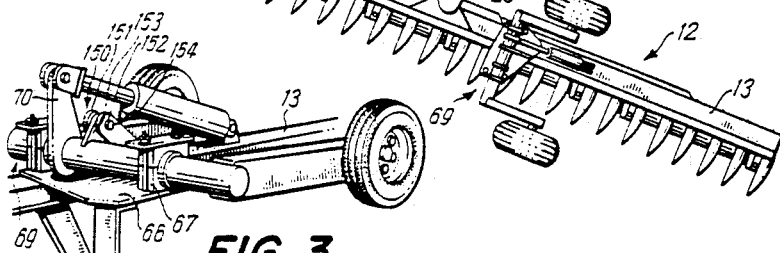
FIG. 3 is a perspective view of the transport wheel assembly yoke of the present invention.

Referring now in detail to the embodiments chosen for the purpose of illustrating the present invention, numeral 10 in FIG. 1 denotes generally a harrow assembly comprising a front disc harrow unit 11 and a rear disc harrow unit 12. The front harrow unit 11 includes elongate frame member or beam 13 having downwardly extending, rigid support brackets 14. Numerous support brackets 14 are spaced in associated pairs along the bottom side of frame 13, as depicted in FIG. 3. Each pair of support brackets 14 freely journals therebetween elongate, cylindrical shafts 15, so that shafts 15 turn between their associated brackets 14. Any appropriate journal means, such as bearing blocks (not shown) can be supported by brackets 14 to allow for more efficient turning of shafts 15 therein, as is commonly known in the art. Rigidly secured to shafts 15 to turn therewith are gangs of circular, concave harrow discs 16 or other harrow-type soil workers, such as harrow teeth. The general, previously discussed disc harrow units 11 and 12 are conventional and need not be described in greater detail herein. The essence of the present invention now to be described resides in the combination of elements which provide means to tow the harrow assembly 10 either in a transport mode or in a working mode.

Figure 2:
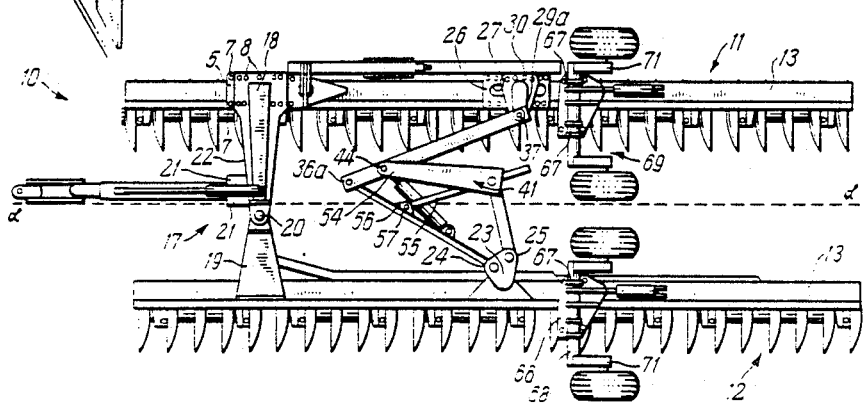
FIG. 2 is a plan view of the present invention in a transport mode.

The front harrow unit 11 and rear harrow unit 12 are pivotally coupled in spaced relationship near corresponding ends by hinge assembly 17. Hinge assembly 17 includes flat, elongate support bracket 5 which is immovably mounted to the top surface of frame 13. Support bracket 5 defines centrally disposed, elongate slot 6 therethrough, extending longitudinally along beam 13. Slot 6 provides a surface along brackets 5 for welding bracket 5 to frame 13. Support bracket 5 also defines therethrough, space mounting apertures 7 along its outer and inner periphery. Hinge assembly 17 also includes horizontal coupling arm 18. Coupling arm 18 defines apertures 8 which align with apertures 7 of support bracket 5. Bolts or other conventional, releasable attachment means (not shown) are received through apertures 7 and 8 to immovably secure coupling arm 18 to bracket 5. Arm 18 can thus be selectively adjusted and immovably anchored along bracket 5 in this manner. Coupling arm 18 extends rearwardly toward rear unit 12 and horizontal coupling arm 19, which is rigidly attached to frame 13 of rear unit 12 and extending horizontally toward front unit 11. Coupling arms 18 and 19 are pivotally or hingedly joined by a single, vertical axis pivot pin 20. This allows the two harrow units 11 and 12 to swing in a horizontal plane relative to each other between variable angled soil-working positions, shown in FIG. 1, and a spaced, parallel transport position, shown in FIG. 2. Further, as shown in FIGS. 1 and 2, coupling arm 18 is longer in the horizontal dimension than coupling arm 19, so that coupling arm 18 extends rearwardly toward rear unit 12 and terminates past axis $a$, the longitudinal axis midpoint between frames 13 of front unit 11 and rear unit 12, when the units 11 and 12 are arranged parallel in a transport orientation, FIG. 2. Hinge assembly 17 also includes triangular, spaced mounting brackets 21 which are rigidly attached along the outer surface 22 of coupling arm 18 and extend outwardly.

Figure 4:
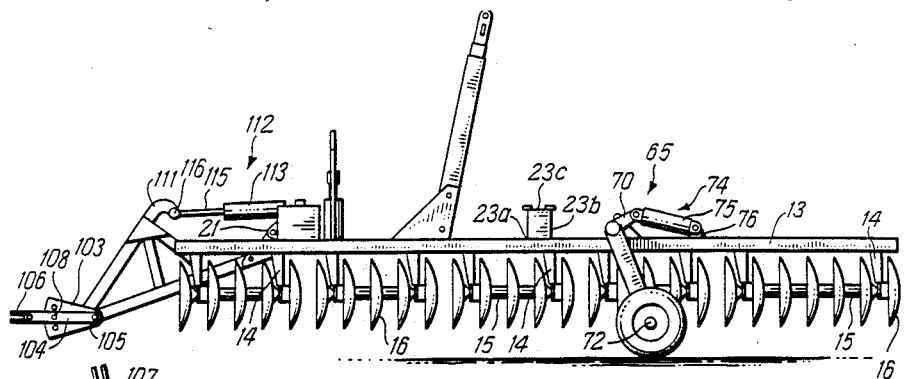
FIG. 4 is a side view of one harrow unit of the present invention in a transport mode.

Triangular upstanding mounting anchor 23 is rigidly attached to the upper surface of elongated frame 13 of rear unit 12, substantially at its midpoint. Mounting anchor 23 includes lower flat, planar mounting flange 23A, upstanding boss 23B and upper, flat planar flange 23C. Boss 23B spaces plates 23A and 23C, which overlap boss 23B, as shown in FIG. 4, to provide attachment points 24 and 25 projecting inwardly toward front unit 11. Rigidly attached to frame 13 of front unit 11 is support bracket 26 which defines elongate, centrally disposed aperture 27 therethrough, and apertures 28 along its periphery. Triangular, upstanding, mounting anchor 29 having lower flange 29A which defines apertures 30 therethrough, is mounted to bracket 26 by passing retaining pins such as bolts (not shown) through holes 30 and then through corresponding holes 28 to be rigidly secured to bracket 26 and frame 13 of front unit 11. Support anchor 29 is similar to anchor 23 in function and includes an upstanding spacer boss and an upper flange 29B. Lower flange 29B and upper flange 29C overlap the spacer or boss (not shown) and are, therefore, spaced from one another, as in anchor 23.

Supported between brackets 23 and 29 is stabilizing assembly or toggle linkage assembly 35. Stabilizing assembly 35 corresponds identically in structure and function to that disclosed in U.S. Pat. No. 4,591,003, of which I co-invented. While the major elements of assembly 35 are discussed herein, reference is made to U.S. Pat. No. 4,591,003 for structure and operation of the stabilizing assembly 35. Assembly 35 includes elongate steel bar member or front stabilizer 36, which is pivotally attached by pin 37 between flanges 29A and 29B of upstanding anchor 29 at one end. Stabilizer 36 defines bifurcated or forked end 36A, and is pivotally attached at forked end 36A by pin 38 to elongate steel bar member or rear stabilizer 39. Stabilizer 39 is pivotally attached at its other end at corner or point 24 of upstanding anchor 23 by pin 40. Upstanding, elongated generally triangular latch support link 41 having upper and lower plates 42 and upstanding, elongate centrally disposed plate (not shown) is pivotally attached to stabilizer 36 by pin 44 close to, but spaced front pin 38, as shown in FIGS. 1 and 2. Elongate steel bar member or support beam 45, which is somewhat shorter than stabilizers 36 and 39, is connected at one end to point 25 of mounting bracket 23 by pin 46, and is attached at its other end to and between plates 42 of support link 41 by pin 47.

Hydraulic actuating means or piston and cylinder assembly 50 actuates stabilizing assembly 35, and includes hydraulic cylinder 51 which is pivotaly attached to rigid bracket 52 of stabilizer 39. Piston rod 53 of assembly 50 is correspondingly attached in pivotal relationship to rigid bracket 54 of stabilizer 36. Therefore, the movement of piston rod 53 in and out of cylinder 51 will cause toggle links or stabilizers 36 and 39 to pivot away from or towards one another, thus causing the front unit 11 and rear unit 12 to move toward or away from one another. Stabilizing assembly 35 also includes elongate latch bar 55 which is pivotally attached by pin 56 to bracket 57 of stabilizer 39, and extends toward latch support link 41, as shown in FIGS. 1 and 2. Stabilizing assembly 35 can be actuated to selectively move front unit 11 and rear unit 12 toward or away from one another. Assembly 35 can be releasably locked in any of several, selected positions using, in conjunction with the structure discussed above, elements which are not described herein, but whose structure and function are described in detail in my U.S. Pat. No. 4,591,003. This stabilizing assembly 35 is designed specifically to provide a sturdier and more stable arrangement for an offset disc harrow during transport, and when incorporated with the other features of the present invention, provides for much increased stability during transport of harrow assembly 10.

Figure 5:
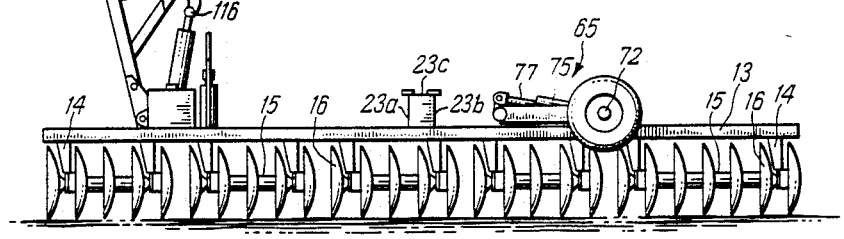
FIG. 5 is a side view of one harrow unit of the present invention in a working mode.

Both the front unit 11 and the rear unit 12 include separate transport wheel assemblies 65. Transport wheel assemblies 65 are identical for both front unit 11 and rear unit 12, and include a flat, planar support plate 66 which extends rearwardly in cantilever fashion from both front unit 11 and rear unit 12 to overhang in spaced relationship over discs 16. Upstanding pillow blocks or journals 67 are secured to the top portion of plate 66, and journal therein crossbar 68 of U-shaped frame or yoke 69 within journals 67. Yoke 69 includes upstanding bellcrank 70 rigidly attached to crossbar 68. Securely depending from each free end of and turning with crossbar 68, are tines or arms 71 of yoke 69. Transversely extending axles 72 are journaled by the free ends of arms 71 to freely turn thereon. Transport wheels 73 are fixed to axles 72 to turn therewith. Hydraulic actuating assemblies or piston and cylinder assemblies 74 rotate yoke 69. Actuating assembly 74 includes cylinder 75 pivotally attached to upstanding bracket 76 fixed to frame 13. Piston rod 77 of assembly 74 is pivotally attached at its free end to the free end of bellcrank 70, as shown in FIGS. 4 and 5. It is therefore understood that the movement of piston rod 77 in and out of cylinder 75 will cause bellcrank 70, and therefore yoke 69 to rotate clockwise or counterclockwise within journals 67, and thus raise and lower transport wheels 73. Transport wheels 73 are arranged parallel to elongate frames 13 of their respective harrow units 11 and 12. Therefore, when yoke 69 is in a downward position, and wheels 73 engage the ground, the front unit 11 and the rear unit 12 are aligned between the tines or arms 71 or their respective yokes 69, so that arms 71 are spaced from and do not contact discs 16.

Transport wheel assemblies 65 can each be locked in either raised or lowered positions using transport wheel assembly lock 150. Lock 150 is shown in FIG. 3, and includes two, upstanding, spaced, parallel anchor brackets 151 securely mounted to the top of frame 13 at their lower ends and angled upwardly toward hinge assembly 17. Brackets 151 include a first upper pair of opposed aPertures 152 therethrough at their upper ends, and similarly a second pair of lower opposed apertures (not shown) therethrough along their lower ends. Securely mounted to crossbar 68 is angled, elongate bracket 153 having an aperture (not shown) therethrough at its upper or free end. Bracket 153 is attached to crossbar 68 and at an angle so that the rotation of yoke 69 will rotate bracket 153 between anchor brackets 151. When transport wheel assemblies 65 are in their upper or raised position, as shown in FIG. 3, the aperture (not shown) of bracket 153 aligns horizontally with upper aperture 152 of anchor brackets 151. Pin 154 is then inserted to mechanically lock transport assemblies 65 in a raised position. Similarly, when assemblies 65 are in a lowered positions, as shown in FIG. 4, the aperture (not shown) of bracket 153 aligns horizontally with the lower aperture (not shown) of anchor brackets 151. Pin 154 is inserted through these apertures to lock asembly 65 in a lowered position.

A working drawbar assembly 80 is positioned forwardly of front frame member 11 and includes elongate, square steel offset bar 81 arranged in parallel relationship to elongate frame 13 of front unit 11. Spaced along and extending rearwardly of the rear side of offset bar 81 are pairs of spaced, extensions or support arms 82. Arms 82 are pivotally coupled by pins 83 to rigid, horizontally extending support brackets 84, projecting forwardly from and attached to shafts 15 by conventional bearing blocks (not shown). Shafts 15, therefore, not only freely turn within these bearing blocks, but also provide rigid support for support brackets 84. Thus, offset bar 81 is spaced from and offset forwardly from front unit 11 and pivots on brackets 84. A drawbar bracket 85 comprised of a pair of parallel, triangular, flat steel plates 86 supports elongate square steel drawbar 87. The drawbar bracket 86 is laterally, adjustably mounted on offset bar 81 by using releasable pins or bolts 88 which pass through apertures 89 through offset bar 81. As mounted, the drawbar 87 is rigid with respect to offset bar 81. At its forward end, the drawbar 87 carries a pivoted coupling 90 for attachment to a trailer hitch or hitch pin of a tractor or other vehicle (not shown) used to tow the harrow assembly 10.

Figure 6:
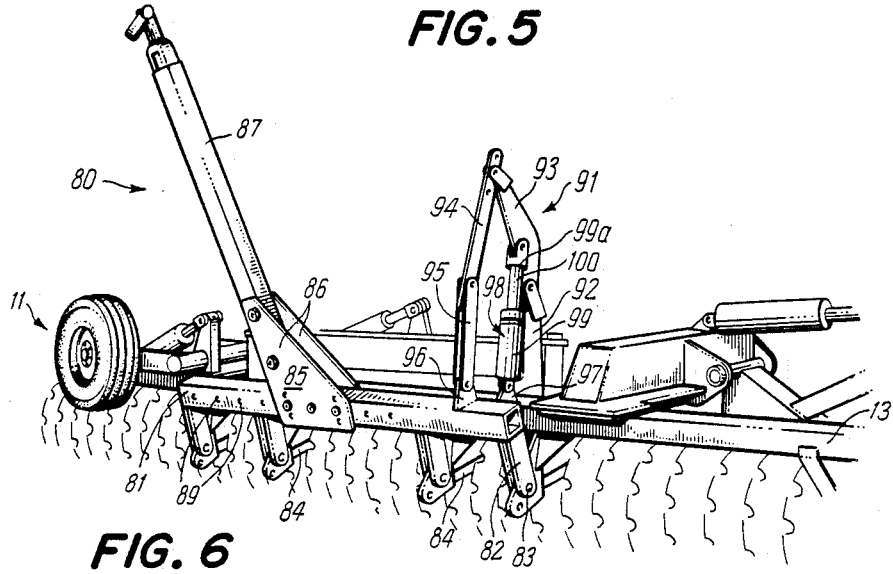
FIG. 6 is a perspective view of the working drawbar assembly of the present invention.
Figure 7:
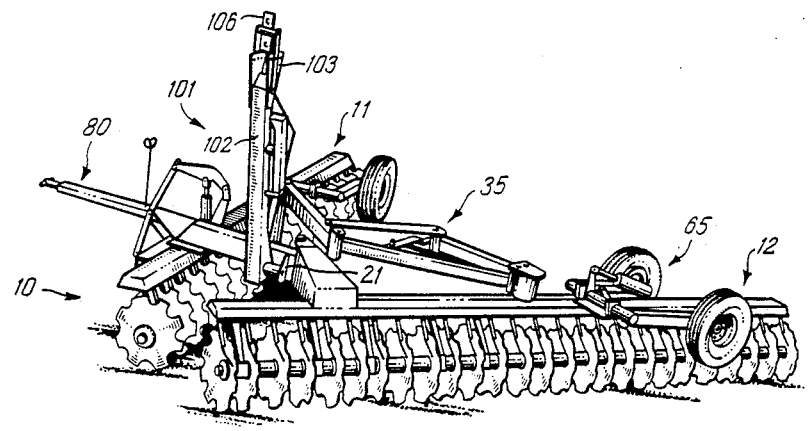
FIG. 7 is a perspective view of the towing drawbar assembly of the present invention.

Working drawbar assembly actuating means 91 raises and lowers drawbar assembly 80 and includes triangular, upstanding standard 92 which is rigidly attached to frame 13 of front unit 11. Bellcrank link 93 is pivotally attached at one end to the upper, free end of upstanding standard 92, and is pivotally attached at its other end to downwardly extending, elongate toggle link or arm 94. Link 94 is correspondingly, pivotally attached to upstanding, elongate, forked link 95. Link 95 is, in-turn, pivotally attached to upstanding bracket 96 rigidly mounted to the front of offset bar 81. Upstanding, triangular support bracket 97 attached to frame 13 pivotally supports hydraulic piston and cylinder assembly 98. Assembly 98 includes a conventional hydraulic cylinder 99 pivotally attached to bracket 97, and a piston rod (not shown) which is pivotally attached by a forked bracket 99A to the central portion of bellcrank link 93, as shown in FIG. 6. It is obvious, therefore, that the movement of piston rod (not shown) into and out of cylinder 99 will raise and lower bellcrank link 93, which in turn raises and lowers offset bar 81 and drawbar 87. Elongate, tubular, channel-shaped transport lock 100 fits over and substantially covers the piston rod, when the rod is extended out of cylinder 99 so that one end of lock 100 abuts the top of cylinder 99, and the other end of lock 100 abuts bellcrank 93. Lock 100 thus ensures that assembly 80 is held in a raised position during transport of harrow assembly 10.

Harrow assembly 10 also includes towing drawbar assembly 101 to tow assembly 10 in a transport mode. Assembly 101 includes elongate, steel drawbar 102 which is pivotally attached at its rearward end between spaced brackets 21. Rigidly carried at the forward end of drawbar 102 are spaced, flat, triangular adjusting plates 103. Forwardly extending, elongate, flat, parallel, spaced drawbar extensions 104 are pivotally attached to drawbar 102 by pin 105 passing transversely through drawbar 102. Spaced drawbar extensions 104 are spaced outwardly with respect to triangular plates 103. Drawbar extensions 104 support at their outer ends, coupling 106 which is adapted to connect to a trailer hitch or hitch pin of a towing vehicle (not shown). Along their forward edges, plates 103 define therethrough corresponding, aligned adjusting apertures 107. It is, therefore, understood that extensions 104 can be adjusted along the forward portion of plate 103 by pivoting the extensions 104 at pin 105 and by passing locking pin 108 through the selected, corresponding, aligned adjusting apertures 107 of plates 103, depending upon the elevation of the trailer hitch or hitch pin of the towing vehicle.

Drawbar assembly 101 also includes elongate, angled support braces 109 which are rigidly joined together at spaced plates 110. L-shaped, rearwardly extending mounting bracket 111 is attached to the end of arm 109 at plate 110, and extends toward towing drawbar assembly actuating means 112. Actuating means 112 includes hydraulic cylinder 113 which is pivotally attached to bracket 114 of hinge arm 18. Piston rod 115 extends from cylinder 113, and is pivotally attached by pin 116 to the end of L-shaped bracket 111, as shown in FIG. 4. It is thus seen that the movement of piston rod 115 into and out of cylinder 113 will raise and lower assembly 101. Assembly 101 can also be held into an upright position by a transport lock identical in structure and function to lock 100, as previously described.

The hydraulic actuating assemblies or hydraulic piston and cylinder assemblies incorporated into harrow assembly 10 are powered by a hydraulic pump integral with the towing vehicle (not shown). All towing vehicles, such as farm tractors, designed to tow a harrow assembly 10, will have a hydraulic pump and the associated hydraulic line connections. The hydraulic circuit utilized by harrow assembly 10 is depicted in schematic form on FIG. 8. The hydraulic circuit incorporates a combination of known elements which are connected by conventional hydraulic lines and are well known to those skilled in the art, and so are not further described herein. Although various designs for the hydraulic circuit, which are known to those skilled inthe art, may be used, the particular arrangement of the hydraulic circuit of the present invention, however, is designed to increase the safety and efficiency of the assembly 10.

Figure 8:
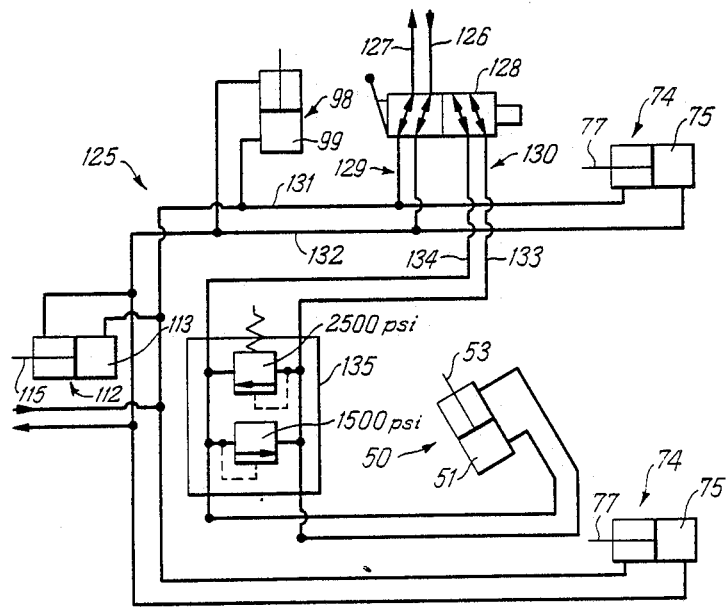
FIG. 8 is a schematic representation of the hydraulic circuit utilized by the present invention.

Referring to FIG. 8, the hydraulic circuit, denoted generally as numeral 125, includes hydraulic fluid inlet line 126 and hydraulic fluid outlet line 127, which feed into and out of, respectively, manually controlled hydraulic fluid diverting valve 128. Diverting valve 128 is capable of delivering hydraulic fluid into or out of two, separate hydraulic circuits denoted generally as hydraulic circuit 129 and hydraulic circuit 130. Manual diverting valve 128 can be shifted to deliver fluid either into or out of each of hydraulic lines 131 or 132 of circuit 129, or alternatively, into or out of each of the hydraulic lines 133 or 134 of hydraulic circuit 130. Hydraulic circuits 129 and 130, however, cannot be simultaneously energized. Further, all the hydraulic actuating assemblies include double-acting cylinders.

Hydraulic circuit 129 energizes hydraulic actuating assemblies 74 of transport wheel assemblies 65, working drawbar actuating assembly 98, and towing drawbar actuating assembly 112. Hydraulic circuit 129 is designed so that when circuit 129 is energized, the appropriate functions of the hydraulic actuating assemblies associated with this circuit are carried out simultaneously. This is a feature which prevents, for example, the working drawbar 87 to be extended in a lowered position at the same time the harrow assembly 10 is being towed in a transport mode. Therefore, when manual diverting valve 128 is shifted to deliver hydraulic fluid into line 132, piston rods 77 are forced out of cylinder 75 which raises transport wheel 73 and drops the harrow discs 16 onto the ground. Simultaneously, the piston rod of working drawbar actuating assembly 98 is forced into cylinder 99 which lowers working drawbar assembly 80. Also simultaneously, piston rod 115 is forced into cylinder 113 which raises transport drawbar assembly 101 into a raised, inoperable position. Therefore, the transport drawbar assembly 101 cannnot be in a lowered or operable position when harrow assembly 10 is being towed in a working mode. When hydraulic fluid is pumped into line 132, it is obvious to those skilled in the art that hydraulic fluid is pumped out of line 131 of the associated hydraulic actuating assemblies.

Conversely, when hydraulic fluid is pumped into hydraulic line 131 and out of hydraulic line 132, transport wheels 73 are lowered and the harrow assembly 10 is raised into a transport mode. Simultaneously, transport drawbar assembly 101 is lowered and working drawbar assembly 80 is raised, for obvious safety and efficiency reasons.

Manual diverting valve 128 can also be actuated so that hydraulic fluid is pumped either into or out of hydraulic lines 133 or 134 of hydraulic circuit 130. Hydraulic circuit 130 energizes actuating assembly 50 of stabilizing assembly or toggle linkage 35. When fluid is pumped into line 133, piston rod 53 is forced into cylinder 51 and hydraulic fluid is forced out of cylinder 51 through line 134. When circuit 130 is energized in this fashion, front unit 11 and rear unit 12 are drawn into parallel relationship in the transport mode. Conversely, when hydraulic fluid is pumped into line 134 in a controlled manner by valve 128, the front and rear units are biased away from one another, pivoting the hinge assembly 17 to any, selected, angle within its range of motion about pin 20. Relief valve 135 is a conventional relief valve well known in the art and is contained within hydraulic circuit 130 to assist in the maintenance of the proper pressures in lines 134 and 133 from valve 135 to assembly 50. Preferably, the relief valve 135 is set so as to allow a maximum of 2500 PSI in line 133 and a maximum of 1500 PSI in line 134.

It will be obvious to those skilled in the art that many variations may be made in the embodiments here chosen for the purpose of illustrating the present invention, and full results may be had to the doctrine of equivalents without departing from the scope of the present invention, as defined by the appended claims.

What is claimed is:

1. A gang disk harrow assembly adapted to be towed either in a working mode or in a transport mode by a towing vehicle comprising:
   (a) an elongate front gang disk harrow unit;
   (b) an elongate rear gang disk harrow unit;
   (c) hinge means pivotally connecting said front unit to said rear unit; p1 (d) first support means including a yoke pivotally attached to said front unit and a pair of wheels journaled by said yoke, wherein said wheels are spaced on either side of said front unit, for supporting a portion of said front unit in an elevated position;
   (e) second support means including a yoke pivotally attached to said rear unit, and a pair of wheels journaled by said yoke, wherein said wheels are spaced on either side of said rear unit, for supporting a portion of said rear unit in an elevated position;
   (f) first towing means pivotally connected to said front unit for connecting said front unit to said towing vehicle in said working mode; and
   (g) second towing means pivotally connected to said hinge means for connecting said hinge means to said towing vehicle in said transport mode.

2. The gang disk harrow assembly defined in claim 1, wherein said hinge means includes a first elongate coupling arm and a second elongate coupling arm hingedly connected to said first coupling arm, said first coupling arm being longer than said second coupling arm, and mounting means attached to said first coupling arm for mounting said second towing means to said first coupling arm.

3. The gang disk harrow assembly defined in claim 1, and actuating means attached to said front unit and to said rear unit for selectively pivoting said front unit toward or away from said rear unit.

4. A gang disk harrow assembly adapted to be towed in either a working mode or a transport mode, comprising:
   (a) an elongate, front gang disk harrow unit having multiple, spaced disks;
   (b) an elongate, rear gang disk harrow unit having multiple spaced disks and being pivotally connected to said front gang disk harrow unit;
   (c) actuating means connecting said front unit and said rear unit for selectively pivoting said front unit toward or away from said rear unit;
   (d) a first towing means attached to said front unit for towing said assembly in a working mode;
   (e) a first pair of spaced transport wheels attached to said front unit wherein said first pair of wheels are spaced on either side of said front unit;
   (f) a second pair of spaced transport wheels attached to said rear unit wherein said second pair of wheels are spaced on either side of said rear unit; and
   (g) a second towing means attached to said front unit for towing said assembly in a transport mode.

* * * * *